Nov. 22, 1949     C. H. FOLMSBEE     2,489,216
DUAL SAFETY VALVE
Filed Aug. 4, 1943
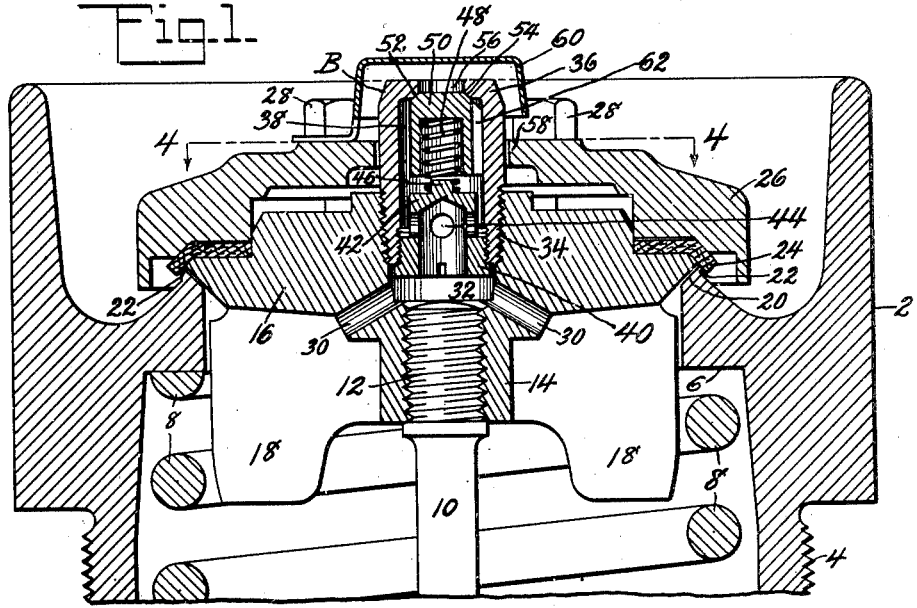
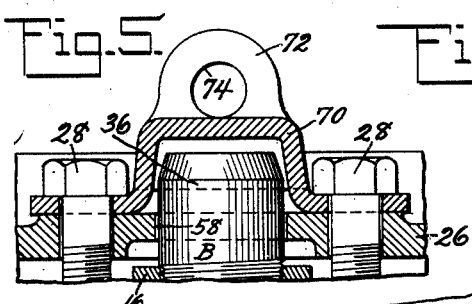
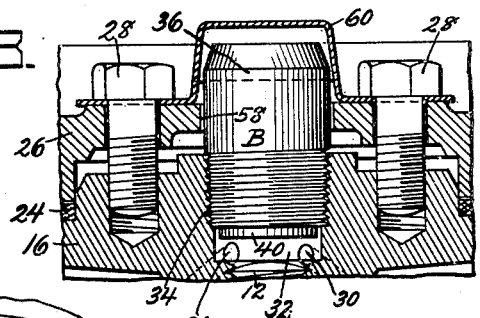
INVENTOR
Clyde H. Folmsbee
BY
Robert A. Shields
ATTORNEY Patented Nov. 22, 1949

2,489,216

UNITED STATES PATENT OFFICE 2,489,216

DUAL SAFETY VALVE

Clyde H. Folmsbee, Berwick, Pa., assignor to American Car and Foundry Company, New York, N. Y., a corporation of New Jersey Application August 4, 1943, Serial No. 497,279

3 Claims. (Cl. 137—53)

This invention relates to safety valves in general and in particular to safety valves for use with closed vessels such as railway tank cars.

A very large number of closed pressure vessels now in use are not equipped with any type of protection against load pressure, that is, against pressures below atmospheric or what may be commonly termed vacuum. With closed pressure vessels, particularly of the railway car type, the vessel may be emptied by use of pumps or the vessel may be located at some point high in relation to the discharge point. Under such conditions sub-atmospheric pressures may be established within the vessel or tank with the result that the vessel or tank may completely or partially collapse. Complete or partial collapse may also occur where the tank or vessel has been emptied during the heat of the day and then closed. Upon condensation of the vapors within the tank sub-atmospheric pressures will be established causing failure of the tank. Owners of railway tanks and pressure vessels realize the danger of establishing sub-atmospheric pressures within a tank, particularly where such tank is designed for low pressure storage of material, but to apply a vacuum relief valve to such tanks which do not have any relief would have necessitated the shopping of the tank or vessel and making more or less major changes thereon. It is an object, therefore, of the present invention to provide a safety or vacuum relief valve which may be applied to existing pressure safety valves without requiring any extensive modification of the valve structure.

A further object of the invention is the provision of a dual safety valve capable of protecting a closed vessel against both high and low internal pressures.

A still further object of the invention is the provision of a dual safety valve capable of passing matter in either direction dependent upon the differential pressures on opposite sides of the valve.

These and other objects of the invention will be apparent to persons skilled in the art from a study of the following description and accompanying drawings, in which Fig. 1 is a sectional view taken substantially through the center of the improved valve;

Fig. 2 is a plan view of the valve;

Fig. 3 is a sectional view taken substantially on line 3—3 of Fig. 2;

Fig. 4 is a sectional view taken substantially on line 4—4 of Fig. 1, and

Fig. 5 is a sectional view similar to Fig. 3 but showing a slight modification.

Referring now to the drawings in detail, it will be seen that the valve is constructed with a body portion 2 threaded as at 4 for connection with the closed pressure vessel or tank. The valve body is generally circular in form and provided with a bore terminating so as to form a shoulder 6. This shoulder 6 forms a seat for one end of a spring 8, the other end of which bears against a seat member (not shown) held in place by a bolt or rod 10. In the present instance the bolt or rod 10 has its upper end threaded as at 12 in order that it may be fastened to the internally threaded boss 14 of the valve member 16. Movement of the valve in the body is controlled, of course, by the spring and guided by wings 18, all as clearly shown in Fig. 1. The valve body is formed with an inclined seat 20 terminating in a lip 22 adapted to engage a gasket 24. The gasket 24 is clamped in place between the valve member 16 and a valve cap member 26. The clamping action is obtained through a plurality of stud bolts 28 extending through the valve cap 26 and threaded into the valve member 16, all as clearly shown particularly in Fig. 3. Thus the retainer cap 26 can be removed to permit replacement or renewal of the gasket without disturbing the valve setting or metallic seating contact. The valve structure as just described would of itself be capable of controlling internal pressure in excess of that for which the spring 8 had been chosen.

In order that the valve may permit passage of matter into the tank or vessel when low internal pressures exist, passages 30 may be drilled through boss 14 of the valve member and into a bore 32 formed in the central portion of the valve member. The upper end of this bore 32 is threaded as at 34 to receive a low pressure or vacuum relief valve assembly B. This low pressure or vacuum relief assembly is formed by a cylindrical body portion 36 having portions of its outer surface threaded to engage threads 34 previously referred to. The cylindrical body portion 36 is provided with an internal bore 38 threaded at its outer end to receive a hollow plug 40. The plug is formed with a projecting boss 42 having radial holes 44 formed therein and an axially extending lug 46 adapted to form a retainer for spring 48. The opposite end of the spring 48 engages within a cup-shaped valve member 50 which is provided with a beveled face 52 adapted to engage with a correspondingly beveled seat 54 formed in the body 36 adjacent the perimeter of a port 56. The cylindrical body portion 36, as clearly shown in the figures, extends through a hole 58 formed in the central portion of the valve cap member 26 and is protected by a dust cap 60 held in place by at least some of the bolts 28, as clearly shown in Figs. 1 to 3 inclusive. Thus it will be seen that the cap member or retainer 26 can be removed to permit replacement of the gasket 24 without in any way disturbing either the main or the auxiliary valves. The valve member 50 of the low pressure or vacuum relief valve is provided with a plurality of wings 62, as clearly shown in Figs. 1 and 4, for the purpose of guiding the valve member to its seat in the body 36.

In some cases it is required that the safety valve be lifted periodically to determine whether or not the valve is operating and to test the point at which the valve will open. In such cases the dust cap may be formed as a casting or forging 70 (Fig. 5) held in place as is the cap 60 but provided with an upstanding eye 72 having a hole 74 therein for reception of a lift bar or other lift means.

From the preceding description of the complete valve it will be seen that the valve member 16 cooperates with the body 2 to control pressures within the tank or vessel and still permit passage of matter out of the tank over seat 20 and past gasket 24 whenever the internal pressure of the tank or vessel exceeds that for which the spring 8 is set. The valve 50 is, of course, likewise subjected to the internal pressure of the tank but can not permit passage of matter out of the tank since the valve will be forced more tightly onto its seat. When, however, the pressure within the tank or vessel drops below atmospheric pressure or below the pressure existing outside of body 2, the valve member 50 may move against the compression of spring 48 and permit matter to flow from the exterior of the tank into the interior thereof. The flow of matter into the tank or vessel will be through port 56, past valve member 50, through radial holes 44 and through the hollow plug 40 and into the vessel interior through holes 30 bored in the valve member 16. In this way it will be seen that valve 16 controls and permits flow of matter out of the tank or vessel, while valve 50 controls and permits flow of matter into the tank, thereby protecting the tank against abnormal pressures in either direction. It will also be seen that the vacuum or low pressure relief valve B can be assembled as a complete unit and threaded into the valve member 16. In this way existing safety valves protecting a tank or vessel against excess internal pressure may be quickly and cheaply modified to protect the tank against low internal pressures by merely boring the hole 58 through retainer 26 and also boring holes 30 and 32 and threading the hole 32 as at 34 for reception of the valve assembly B. With certain types of vacuum relief valves the cap 26 is not used and in these cases it will only be necessary to bore the valve body as at 32 and thread as at 34 and connect the bore to the interior of the surface of the valve member by holes such as 30. With other types of valves, such as those shown in Willoughby Patents 1,665,391 and 1,665,394, it will only be necessary to remove the lifting element from the valve and screw in the valve assembly B subsequent to a connection of the interior surface of the valve to the cavity into which the assembly is to be screwed. It will thus be seen that a dual safety valve has been provided and that this dual safety valve includes a sub-assembly B which may be readily applied to existing valve structures to modify such existing valves so that they may protect the tank or vessel against low internal pressures.

While the construction has been described more or less in detail, it will be obvious to persons skilled in the art that various modifications and rearrangements of parts other than those shown and described may be made and all such modifications and rearrangements of parts are contemplated as will fall within the scope of the appended claims defining my invention.

What is claimed is:

1. A dual safety valve for closed pressure vessels comprising, a main valve body formed with a valve seat, a main valve member movably mounted in said main valve body and formed with a metallic valve face, a gasket carried by said main valve member adjacent the metallic valve face, a retainer cap removably fastened on said main valve member and retaining said gasket in place, said valve seat and face and gasket cooperating to control the flow of matter therethrough in one direction, a main valve spring normally holding said main valve member on the valve seat, and a complete self contained auxiliary valve assembly secured to the main valve member and movable therewith, said self contained auxiliary valve assembly including, a valve body secured in a passage through said main valve member independently of said retainer cap and formed with a valve seat, a hollow valve member movable in said last mentioned valve body, a hollow plug secured to said valve body and formed with a spring seat, and a spring mounted on said spring seat and projecting into said hollow valve member and normally holding said hollow valve member on its seat to control the flow of matter in the other direction.

2. A dual safety valve for closed pressure vessels comprising, a main valve body formed with a valve seat, a main valve member movably mounted in said main valve body and formed with a metallic valve face, a gasket carried by said main valve member adjacent the metallic valve face, a retainer cap removably fastened on said main valve member and retaining said gasket in place, said valve seat cooperating with said valve face and gasket to control the flow of matter through the main body in one direction, a valve stem connected to said main valve member inwardly of the main valve body, a main valve spring surrounding said stem and acting thereon to normally hold said main valve member on the valve seat, said main valve member having a cavity formed therein extending below the plane of said retainer cap and located substantially in alignment with said stem, a complete self contained vacuum relief valve assembly unit secured in said cavity and extending upwardly through and free of connection to said retainer cap, said self contained vacuum relief valve assembly including a valve body formed with a valve seat, a valve member movable in said valve body, a plug secured to said last mentioned valve body and formed with a spring seat, a spring mounted on said spring seat and normally holding said valve member on its seat to control the flow of matter, and passages extending radially upward through said main valve member to intersect and form with said cavity a passage through the main valve member, said vacuum relief valve assembly opening in a direction opposite to that of the main valve member.

3. A dual safety valve for closed pressure vessels comprising, a main valve body formed with a valve seat, a main valve member movably mounted in said main valve body and controlling flow of matter therethrough in one direction, a gasket carried by said main valve member for cooperation with said seat, a gasket retainer cap secured to said main valve member, a main valve spring normally holding said main valve member on the valve seat, a complete self contained auxiliary valve assembly secured in a passage through the main valve member and movable therewith, said self contained auxiliary valve assembly being located on the opposite side of said main valve member from the main valve spring and projecting upwardly through said gasket retainer cap and operating wholly independent of the main valve member to control the flow of matter in the other direction, and a protecting cap overlying said auxiliary valve assembly to thereby prevent injury of said auxiliary assembly, and a common means securing said protecting cap and retainer cap to said main valve member and partially housing said self contained auxiliary valve assembly, said protecting cap being formed with a lifting eye whereby said main valve member may be lifted from its seat on the main body member.

CLYDE H. FOLMSBEE.

REFERENCES CITED

The following references are of record in the file of this patent:

UNITED STATES PATENTS

| Number | Name | Date |
|---|---|---|
| 633,706 | Schwartz | Sept. 26, 1899 |
| 662,154 | Schmick | Nov. 29, 1900 |
| 1,107,383 | Ulstad | Aug. 18, 1914 |
| 1,304,328 | Klems | May 20, 1919 |
| 1,326,124 | Vischer | Dec. 23, 1919 |
| 1,518,233 | Trager | Dec. 9, 1924 |
| 1,541,533 | Tunnell | June 9, 1925 |
| 1,665,394 | Willoughby | Apr. 10, 1928 |
| 1,900,731 | Pippin | Mar. 7, 1933 |
| 1,942,313 | Viele | Jan. 2, 1934 |
| 2,028,755 | Cricca | Jan. 28, 1936 |
| 2,111,430 | Lamar | Mar. 15, 1938 |
| 2,162,096 | Marmorek | June 13, 1939 |